(No Model.) 2 Sheets—Sheet 1.
N. C. MITCHELL & S. P. SHARPLES.
APPARATUS FOR WASHING RUBBER STOCK.
No. 420,515. Patented Feb. 4, 1890.
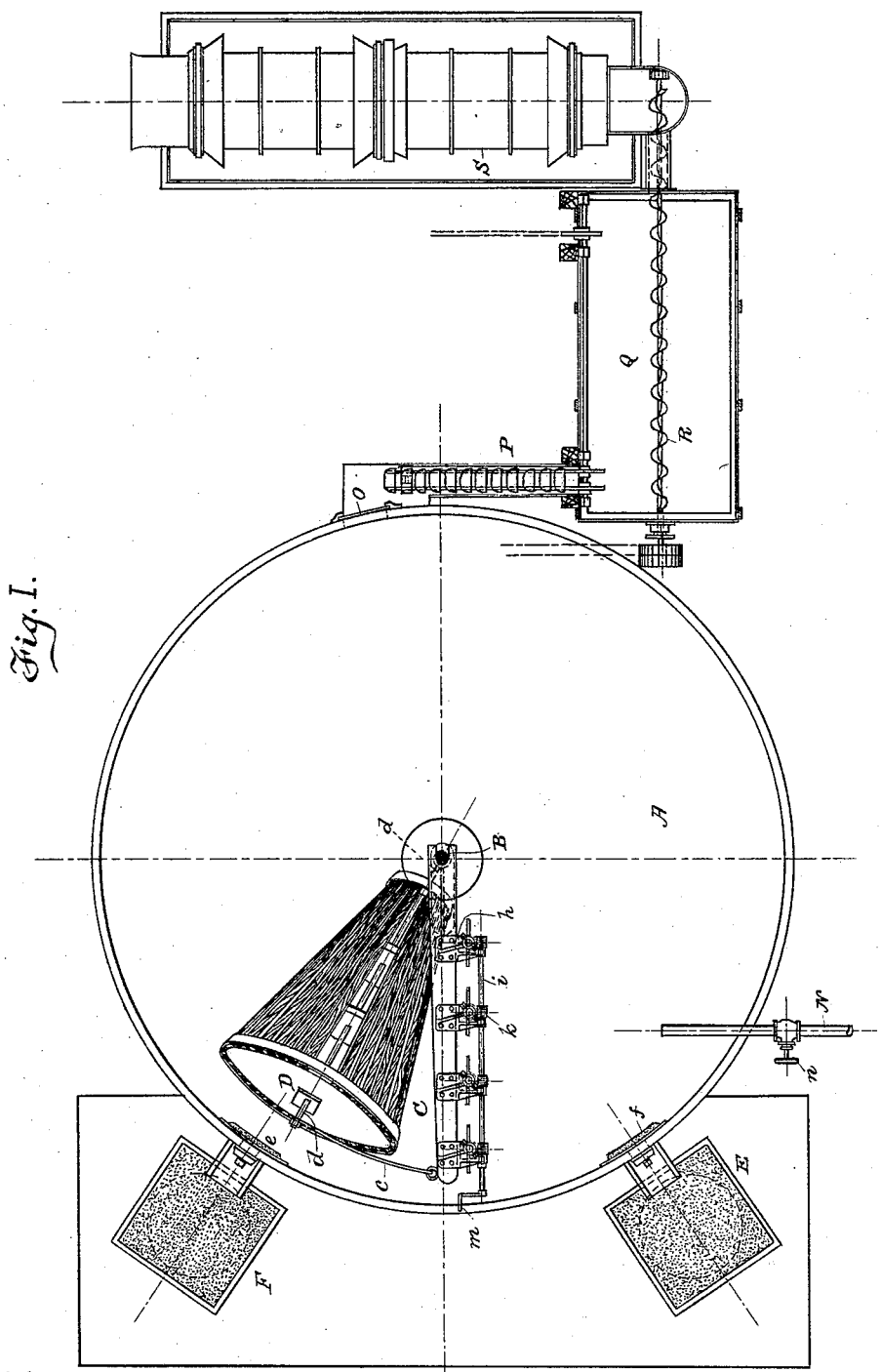

(No Model.) 2 Sheets—Sheet 2.
N. C. MITCHELL & S. P. SHARPLES.
APPARATUS FOR WASHING RUBBER STOCK.
No. 420,515. Patented Feb. 4, 1890.
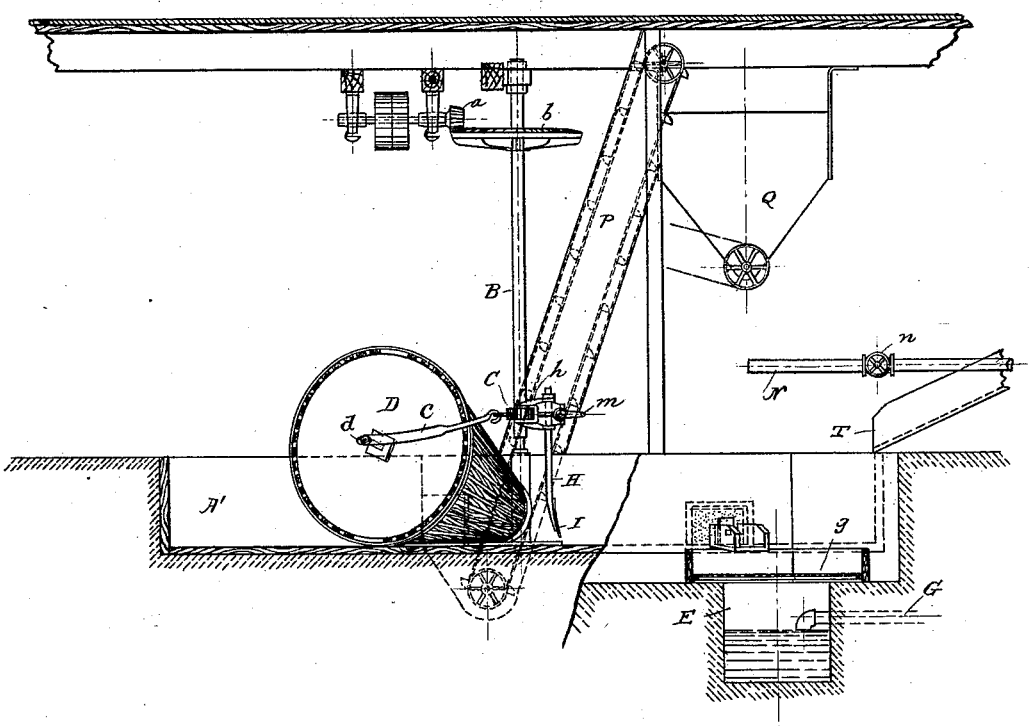
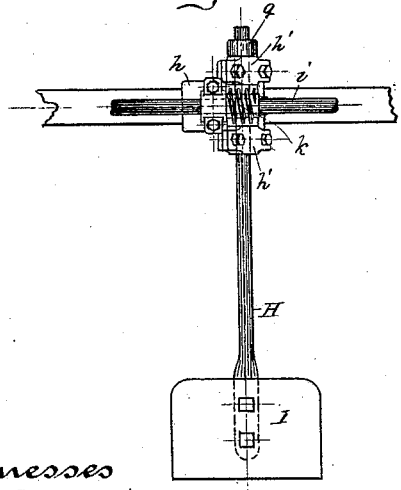
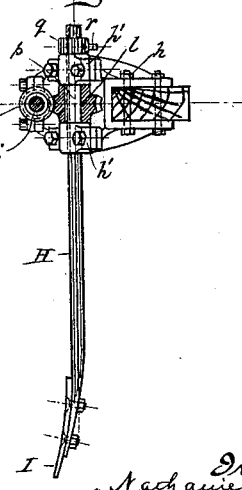

UNITED STATES PATENT OFFICE.

NATHANIEL C. MITCHELL, OF PHILADELPHIA, PENNSYLVANIA, AND STEPHEN P. SHARPLES, OF CAMBRIDGE, MASSACHUSETTS; SAID SHARPLES ASSIGNOR TO SAID MITCHELL.

APPARATUS FOR WASHING RUBBER STOCK.

SPECIFICATION forming part of Letters Patent No. 420,515, dated February 4, 1890.

Application filed September 20, 1889. Serial No. 324,584. (No model.)

*To all whom it may concern:*

Be it known that we, NATHANIEL C. MITCHELL, of Philadelphia, in the county of Philadelphia and State of Pennsylvania, and STEPHEN P. SHARPLES, of the city of Cambridge, in the county of Middlesex and Commonwealth of Massachusetts, have invented a new and useful Improvement in Apparatus for Washing Rubber Stock, which improvement is fully set forth in the following specification.

This invention has reference more particularly to apparatus for washing rubber stock after the acid or other equivalent treatment by which the fibrous matters associated with the rubber stock are disintegrated.

According to this invention the stock, which contains a quantity of mud, decomposed fiber, and other matters soluble in or which may be carried away by water, is placed in a large cylindrical vessel or tub. In the center of the tub or vessel is a vertical shaft carrying a horizontal beam, which extends almost to the edge of the vessel, and to which is attached a large conical roller resting by its own weight upon the stock in the tub. This roller is dragged around by the beam, squeezing out the mud and other foreign matters, which are washed away by the water, which flows continuously in copious streams into the tub. The water is allowed to flow off from time to time through suitable gates onto wire screens, which arrest the rubber.

The cross-beam above referred to carries a series of plows on vertical shafts. These move in advance of the roller, turning and stirring up the stock until all parts of it have been thoroughly washed. The vertical shafts may be turned by means of a horizontal shaft and worm-gearing to adjust the plows to any desired position. When the operation of washing is deemed complete, the plows are set obliquely to carry the stock toward the periphery of the tub, a discharge-gate is opened, and the tub emptied by the movement of the plows, the stock being swept into a receptacle adjacent to the tub, where it is caught by an elevator and hoisted to an elevated tank. Thence a screw conveyer carries it into the rotatory washer and separator described in application of N. C. Mitchell, Serial No. 324,582, filed September 20, 1889.

The accompanying drawings, which form part of this specification, illustrate an apparatus constructed in accordance with the invention, Figure I being a plan view of such apparatus, Fig. II a sectional elevation, and Figs. III and IV detail views.

A represents the tub or vat, which is circular in form. At the center is the upright shaft B, driven by a pinion $a$, which engages the gear-wheel $b$ near the upper end of said shaft. To said shaft B, at a level slightly above the top of the tub, is firmly secured the cross-beam C.

D represents a large and heavy conical roller, whose periphery is formed of wooden slats or bars set a slight distance apart. Roller D rests by its own weight upon the bottom of the tub. Its spindle $d$ is attached at its inner end to shaft B, and at its outer end is connected to cross-beam C by a link $c$, so that the roller follows the motions of the beam C around the tub.

Two traps E F are arranged alongside the tub, which communicates with them by means of gates $e f$. Each trap is covered by a fine perforated screen $g$, Fig. II, which arrests particles of rubber, but permits water, mud, and fine particles of sand and the like to pass through. Most of the mud and other matters washed out of the rubber settles in the trap, while the water runs off to the sewer by an overflow-pipe G, Fig. II.

To cross-beam C are bolted several castings $h$, constituting hangers. In each hanger are the journal-boxes $h'$ for a vertical spindle $h$, and the several hangers also have bearings for a worm-shaft $i$, which extends parallel to beam C and carries worms $k$. Each spindle has a worm-wheel $l$, which engages one of the worms on shaft $i$. At the lower end of each spindle H is a plow or stirrer I. These plows may be set at any angle by properly turning worm-shaft $i$ by means of the crank-handle $m$.

Each plow-shaft H is provided with a feather $p$, by means of which worm-wheel $l$ is keyed onto the shaft. The shaft is held in position by means of a collar $q$, secured to the shaft by a set-screw $r$, the collar resting upon the upper journal-bar $h'$ of the hanger $h$. On loosening this collar the shaft can be vertically adjusted to any desired position. This provision for vertical adjustment is of some importance in the operation of the apparatus, it being frequently desirable to adjust the plows to penetrate to a greater or less depth in the mass of stock in the tub.

N represents a water-pipe provided with a cock $n$. O is a discharge-gate for removing the stock; P, an elevator for raising it to the elevated receptacle or trough Q; and R is a screw conveyer for carrying it to the rotatory washer and sand-separator S.

In operation the stock to be washed is discharged into the tub A through a chute T. Shaft B is then set into motion, the plows I being set at a proper angle to stir up the stock, constantly exposing different portions thereof to the action of roller D. The latter, by its weight, squeezes out the mud, decomposed fiber, &c., from the rubber, this action being facilitated by the construction of the periphery of the roller with open spaces. A sufficient quantity of water is kept in the tub from pipe N, and from time to time gates $e\ f$ are opened and the muddy water drawn off. The rubber arrested by screens $g$ is thrown back into the tub A. When the operation has proceeded so far as to remove all the impurities that can be practically gotten rid of by this means, discharge-gate O is opened. The plows are then set obliquely to the beam C in such manner as to urge the stock from the center toward the periphery of the tub. At each revolution of the beam a portion of the stock is thus pushed through gate O and is carried by elevator P to receptacle Q, the water in the tub aiding to float off the rubber. From receptacle Q the stock is delivered by screw R to the rotatory washer S, which is described and claimed in application of N. C. Mitchell, filed September 20, 1889, Serial No. 324,582. After a few turns of shaft B the tub A is entirely emptied and ready for treating a fresh batch or charge of stock.

Having now fully described our said invention, what we claim, and desire to secure by Letters Patent, is—

1. An apparatus for washing rubber stock and separating foreign matters therefrom and for similar purposes, said apparatus comprising in combination the following elements: a circular tub adapted to hold the stock and the water used in washing the same, a conical roller composed of bars or slats with intervening spaces for compressing the stock and squeezing out the water and the impurities taken up thereby, and a series of plows or stirrers carried in advance of said roller and constructed to turn up the stock from beneath, exposing fresh portions to the action of the roller, and also to loosen the mass so that it can be permeated with moisture preparatory to the compressing action of the roller, substantially as described.

2. In an apparatus for washing rubber stock, the combination, with the tub, roller, and means for rotating the latter, of a series of plows or stirrers supported in advance of said roller and adjustable vertically, substantially as described.

3. The combination, with the washing tub and roller, of a series of plows each on a vertical spindle supported in advance of said roller and means, such as specified, for simultaneously turning the several spindles to set the plows at any desired angle, substantially as described.

4. The combination of the washing-tub, the vertical shaft at the center thereof, the cross-beam secured to said shaft, the roller connected with and moved by said beam, a series of vertical spindles supported in bearings carried by said beam, and having each a plow or stirrer at its lower end, a worm-wheel on each spindle, and a cross-shaft provided with worms engaging the several worm-wheels for the purpose of adjusting the plows, substantially as described.

5. The combination, with the washing tub or vat provided with a discharge-gate in the periphery thereof, of a rotatory beam or support extending from the center to or nearly to the periphery of said tub and a series of plows supported at intervals by said beam and adapted to be set obliquely thereto, whereby the contents of said tub may be discharged gradually through said gate, substantially as described.

In testimony whereof we have signed this specification in the presence of two subscribing witnesses.

NATHANIEL C. MITCHELL.
STEPHEN P. SHARPLES.

Witnesses to signature of N. C. Mitchell:
PHILIP MAURO,
C. W. CROASDILL,

Witnesses to signature of S. P. Sharples:
JOHN L. S. ROBERTS,
M. E. WOODBURN.